United States Patent [19]

Elmore

[11] Patent Number: 4,538,195
[45] Date of Patent: Aug. 27, 1985

[54] THREE TERMINAL CURRENT DIFFERENTIAL PROTECTIVE RELAY

[75] Inventor: Walter A. Elmore, Coral Springs, Fla.

[73] Assignee: Westinghouse Electric Corp., Pittsburgh, Pa.

[21] Appl. No.: 582,344

[22] Filed: Feb. 22, 1984

[51] Int. Cl.³ .............................................. H02H 7/26
[52] U.S. Cl. ........................................ 361/64; 361/87
[58] Field of Search ...................... 361/64, 68, 76, 87

[56] References Cited

U.S. PATENT DOCUMENTS

| | | | |
|---|---|---|---|
| 2,536,809 | 1/1951 | Hodgkiss | 361/64 |
| 3,148,309 | 9/1964 | Neher | 361/64 |
| 4,275,429 | 6/1981 | Church et al. | 361/64 |
| 4,408,246 | 10/1983 | Ray | 361/64 |
| 4,464,697 | 8/1984 | Sun | 361/64 |

FOREIGN PATENT DOCUMENTS 289520  4/1928  United Kingdom .................. 361/64

Primary Examiner—Harry E. Moose, Jr.
Attorney, Agent, or Firm—Donald R. Lackey

[57]  ABSTRACT

A current differential pilot protective relay apparatus for multi-terminal high-voltage, three-phase alternating current transmission lines. The pilot protective relay system provides comparison, at each terminal of the transmission line, of the currents flowing on each phase of the three-phase transmission line at each terminal thereof. A novel scheme of summing the current-derived signals at one terminal reduces the number of receivers and transmitters necessary to send the local signal from each terminal to all of the other terminals. Instead, the current-derived signals are summed at one of the terminals and the sum signal is then transmitted to each of the other terminals.

7 Claims, 2 Drawing Figures

THREE TERMINAL CURRENT DIFFERENTIAL PROTECTIVE RELAY

BACKGROUND OF THE INVENTION

1. Field of the Invention

This invention relates generally to protective relay apparatus for protecting ac electrical power transmission lines, and more specifically, to pilot protective relay apparatus for providing current differential protection on a multi-terminal ac electrical power transmission line.

2. Description of the Prior Art

Electrical power transmission lines and power generating equipment must be protected against insulation faults and consequent short circuits, which could cause collapse of the power system and serious and expensive apparatus damage. For instance, such a fault condition is caused by lightning-induced flashover from a transmission line to ground or between adjacent transmission line conductors. Under such a fault condition, line currents can increase to several times the normal value thereby causing loss of synchronism among generators and damaging or destroying both the transmission line and the attached equipment. To avoid equipment damage and collapse of the entire power system, faulted apparatus on the main transmission line must be isolated from the network in approximately 0.1 to 0.5 seconds. This isolation time limit must allow for the operation of large circuit breakers, interrupting up to 80,000 A, and the completion of back-up operations if these primary protective devices fail to function properly. To allow sufficient time for circuit interruption, location of the fault must be determined in approximately 8 ms to 20 ms. It is the function of the protective relays, which monitor ac voltages and currents at the transmission line terminals, to locate faults and initiate line isolation via tripping of the appropriate circuit breakers. These faults can be located using any one of several different techniques based on the relationship of the ac voltages and/or currents at the transmission line terminals.

Pilot protection for high-voltage electrical transmission lines identifies faults on the protected line segment (i.e., that section of transmission line with protective relays located at each end) by providing means for the protective relay at each terminal of the protected line segment to receive information regarding system conditions at the other terminal (i.e., the remote terminal). Each protective relay, using the local and remote information, can then make a decision regarding the condition of the intervening protected line segment. For economic reasons, power-line carrier communications or microwave pilot channels are used for long transmission lines, and pilot-wire relaying is used for protecting short transmission line sections of about 10 miles or less. For short high-voltage transmission lines, pilot-wire protective relaying is the only practical technique not based on a time delay, because discrimination with distance-type relays is difficult over such a short distance.

The earliest type of pilot-wire relays required a continuous metallic circuit between the terminals of the protected line segment. In this prior art system, a composite sequence filter at the local and remote terminals converts the three phase currents into a single voltage. The voltage is then applied to the pilot wire, so that the local and remote voltages can be compared at each terminal. These protective relays are electromechanical, including the well-known operating and restraint coils. For normal conditions, more current flows in the restraint coils due to the polarities of the local and remote voltages developed by the composite sequence filters. Under fault conditions, one of the voltages experiences a phase-angle shift, causing more current to flow through the operating coils, tripping the relay and opening the circuit breaker.

U.S. Pat. No. 4,275,429, which is assigned to the same assignee as the present invention, discloses a new and improved current differential pilot relay providing the functions of an electromechanical pilot-wire relay without the necessity of having a continuous, metallic conductor between the local and remote protective relays. That is, this improved pilot-wire relay can use a non-continuous communications channel, such as a low-grade, uninterruptible dedicated telephone line, an optical link, a microwave channel, or power line carrier. A dedicated telephone line maintains an open channel at all times, but has relatively low current capability and is not a continuous metallic circuit, as amplifiers and switchboards may be included in the circuit.

This prior art protective relay system is an all solid-state system, including a protective relay at the local and remote terminals of the protected line segment for comparing voltage signals representative of the current at the local and remote terminals. A composite sequence filter at each terminal develops the voltage signal based on the three phase currents at that terminal. At each terminal, a modulated signal representative of the current-derived voltage signal, is transmitted to the other terminal. At the receiving terminal the modulated signal is demodulated to reproduce the current-derived voltage signal for comparison with the local current-derived voltage signal. Pulse period modulation is a preferred form of communications because the filtering requirements in the demodulator are miniscule, but frequency modulation or any other suitable communications scheme may be used. Additional details of suitable modulation and demodulation techniques can be found in commonly assigned U.S. Pat. No. 4,380,746 and Application Ser. No. 397,944 (filed July 13, 1982), respectively.

An undesirable complexity arises from use of this prior art current differential pilot relay on a multi-terminal transmission line. Assuming a three-terminal line, a protective relay of the prior art solid-state type would be located at each terminal. In one arrangement, communications channel connecting these three protective relays is arranged such that signals from the first terminal propagate to and through the second terminal to the third terminal. Likewise, signals from the third terminal propagate to and through the second terminal to the first terminal. This prior art arrangement requires a total of six receiver-transmitter combinations. The first terminal includes a single transmitter to transmit the pulse-modulated signal to the second terminal. The first terminal also includes two receivers, one each for receiving a signal from each of the second and third terminals. The third terminal also includes a single transmitter and two receivers. The transmitter transmits the current-derived voltage signal from the third terminal to the second terminal, and the two receivers receive the current-derived voltage signals from the first and second terminals. The arrangement at the second terminal is more complex; it includes four transmitters and two receivers. One receiver receives the pulse period modulated signal from the first terminal, and the other receives the pulse-period modulated signal from the third terminal. The first transmitter transmits the signal from the third terminal to the first terminal, and the second transmitter transmits the local signal from the second terminal to the first terminal. The third transmitter transmits the signal from the first terminal to the third terminal, and the last transmitter transmits the local signal from the second terminal to the third terminal.

At each terminal the received signal is demodulated to reproduce the current-derived voltage signal corresponding to the current at each of the other two terminals. At each terminal the local signal is compared with the two received (or remote) signals for fault detection. This technique of comparing the local and remote signals at each terminal allows tripping to be initiated at high speed at all the terminals for faults on the protected transmission line. The primary disadvantage of this prior art technique is the expense associated with the use of transmitter/receiver combinations to transmit to all terminals from all terminals. The present invention discloses a technique for reducing the number of transmitter-receiver pairs and the corresponding cost associated with the prior art protective relay system.

SUMMARY OF THE INVENTION

The present invention discloses a unique pilot protective relay system for multi-terminal transmission lines. The present invention reduces the number of transmitters and receivers at each terminal by summing the local signal and one of the remote signals at one of the terminals. The sum signal, rather than individual local and remote signals, is then transmitted to the protective relay at another terminal.

DESCRIPTION OF THE PREFERRED EMBODIMENTS

Figure 1:
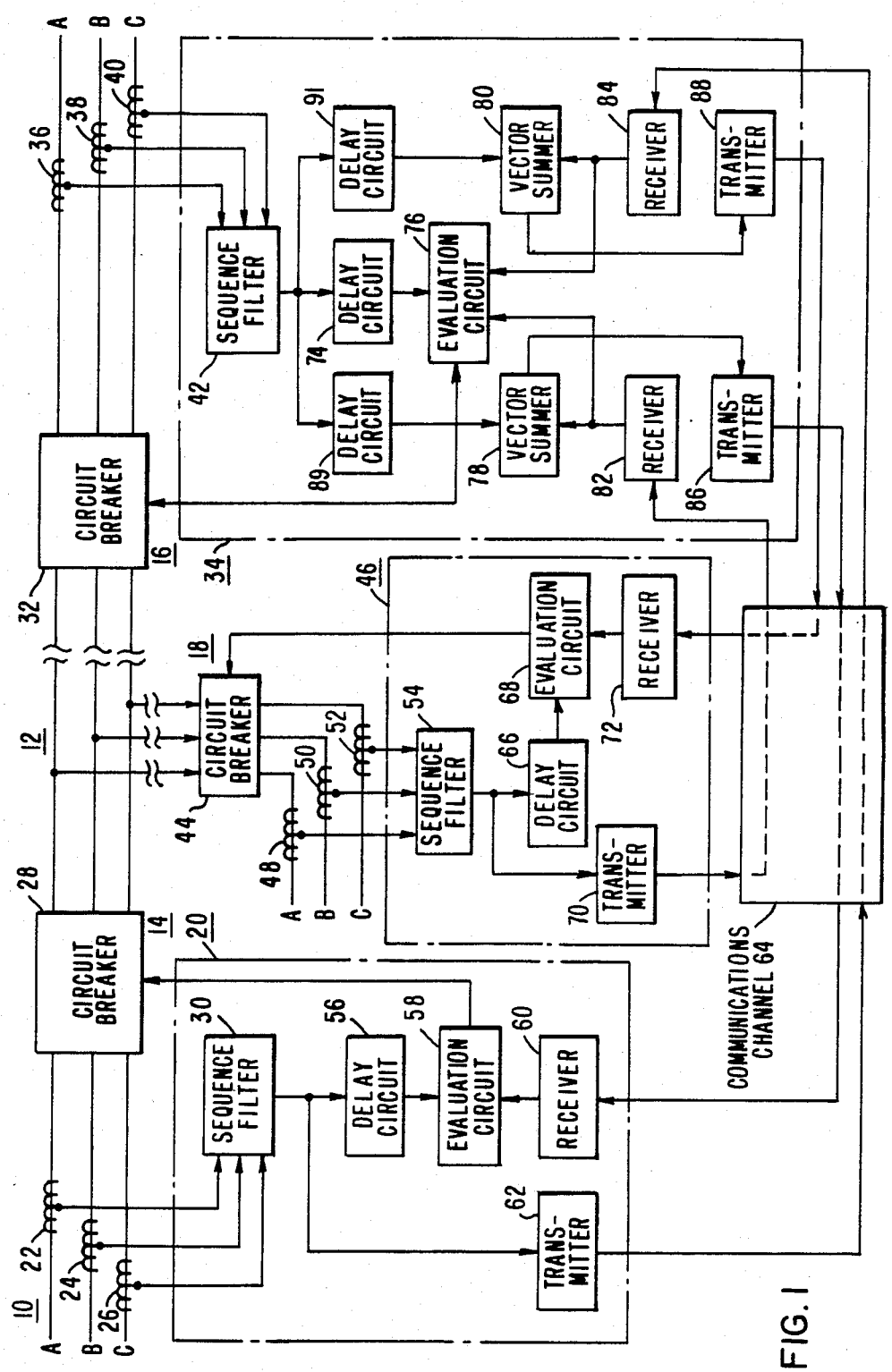

Referring to FIG. 1, there is shown a new and improved protective relay system 10 for providing pilot protection for a transmission line section 12. The transmission line section 12 includes a local terminal 14 and remote terminals 16 and 18. The same principles disclosed herein are applicable to a transmission line section having more than three terminals. At the local terminal 14, a circuit breaker 28 connects the transmission line section 12 to phase conductors A, B, and C. The local terminal 14 also includes a local protective relay 20 constructed according to the teachings of the present invention. A current transformer 22 at the local terminal 14 produces a signal representative of the current on the phase A conductor; a current transformer 24 produces a signal representative of the current on the phase B conductor; a current transformer 26 produces a signal representative of the current on the phase C conductor. The signals from the current transformers 22, 24, and 26 are input to a sequence filter 30 of the local protective relay 20.

At the remote terminal 16, a circuit breaker 32 connects the transmission line section 12 with the phase conductors A, B, and C. A remote protective relay 34 is also located at the remote terminal 16. A current transformer 36 at the remote terminal 16 produces a signal representative of the current on the phase A conductor; a current transformer 38 produces a signal representative of the current on the phase B conductor; and a current transformer 40 produces a signal representative of the current on the phase C conductor at the remote terminal 16. The three signals from the current transformers 36, 38, and 40 are input to a sequence filter 42 of the remote protective relay 34.

At the remote terminal 18 a circuit breaker 44 connects the phase conductors A, B, and C to the transmission line section 12. A remote protective relay 46 is also located at the remote terminal 18. A current transformer 48 produces a signal representative of the current on the phase A conductor at the remote terminal 18; a current transformer 50 produces a signal representative of the current on the phase B conductor; a current transformer 52 produces a signal representative of the current on the phase C conductor. The signals from the current transformers 48, 50, and 52 are input to a sequence filter 54 of the remote protective relay 46.

With the exception of those features associated with the present invention, the local protective relay 20 and the remote protective relays 34 and 46 will be described only generally herein. A more detailed description can be found in U.S. Pat. Nos. 4,275,429 and 4,408,246, both of which are assigned to the assignee of the present invention. These patents are hereby incorporated by reference herein.

Focusing now on the local protective relay 20, it includes a delay circuit 56 responsive to a signal from the sequence filter 30 and an evaluation circuit 58 having a first input terminal connected to an output terminal of the delay circuit 56 and a second input terminal connected to an output terminal of a receiver 60. An output terminal of the evaluation circuit 58 is connected to a control terminal of the circuit breaker 14 for opening thereof. The signal from the sequence filter 30 is also input to a transmitter 62.

The local protective relay 20 operates as follows. The current transformers 22, 24, and 26 convert the three-phase currents associated with the phase conductors A, B, and C to representative voltages input to the sequence filter 30. The sequence filter 30 produces a voltage signal representative of the line currents on the phase conductors A, B, and C. The voltage signal from the sequence filter 30 is simultaneously fed to both the delay circuit 56 and the transmitter 62. One example of a sequence filter that may be used as the sequence filter 30 is disclosed in U.S. Pat. No. 4,146,913, which is assigned to the same assignee as the present invention.

The transmitter 62 modulates the voltage signal from the sequence filter 30 and transmits it to the remote protective relay 34 via a communications channel 64. One modulation technique that can be employed by the transmitter 62 is pulse period modulation, wherein the carrier period is varied linearly with the amplitude of the modulating signal (i.e., the voltage signal from the sequence filter 30). Additional details of this technique can be found in U.S. Pat. No. 4,380,746, which is assigned to the same assignee as the present invention. The receiver 60 receives a pulse period modulated signal from the remote protective relay 34 via the communications channel 64. One type of receiver that can be used is described in U.S. patent application Ser. No. 397,944 (filed July 13, 1982), which is assigned to the same assignee as the present invention. As will be discussed hereinafter, the signal received by the receiver 60 represents a sum of the currents at the remote terminals 16 and 18. The delay circuit 56 is required because the signals to be compared in the evaluation circuit 58 are varying continuously with changes in line current. Therefore, an accurate differential comparison in the evaluation circuit 58 requires that the local voltage signal, i.e., from the sequence filter 30 and the signal received at the receiver 60 from the remote protective relay 34 be coincident in time. The delay circuit 56 imposes a delay equal to the transmission time of the signal from the remote protective relay 34 such that the phase relationship of the local voltage signal is proper relative to the signals from the remote protective relay 34 in the evaluation circuit 58.

The evaluation circuit 58 provides continuous magnitude comparison of the line current flowing at the local terminal 14 and the remote terminals 16 and 18. In the evaluation circuit 58, two quantities are generated from the local and remote voltage signals. The operate quantity is derived by phasor addition of the local and remote voltage signals. The restraint quantity is obtained by adding the local and remote signals on a magnitude basis. Then, the weighted operate and restraint voltages are subtracted and the resultant fed to a level detector. In the level detector of the evaluation circuit 58, the resultant is compared to a predetermined pick-up setting. For an internal fault, the resultant exceeds the pick-up setting, producing a trip signal. Further details of the evaluation circuit 58 can be found in the herein incorporated patents, especially U.S. Pat. No. 4,408,246. The trip signal is input to the circuit breaker 14 for opening the contacts thereof.

Referring now to the remote protective relay 46, the components thereof are identical in structure and function to the components of the local protective relay 20. The voltage signal from the sequence filter 54 is input to a delay circuit 66 and a transmitter 70. An input terminal of the delay circuit 66 is connected to a first input terminal of an evaluation circuit 68. A second input terminal of the evaluation circuit 68 is connected to an output terminal of a receiver 72. An output terminal of the evaluation circuit 68 is connected to a control terminal of the circuit breaker 64. The sequence filter 54 produces a voltage signal representative of the currents on the phase conductors A, B, and C at the remote terminal 18. The voltage signal is input to the transmitter 70 where it is pulse-period modulated, and then propagated to the remote protective relay 34 via the communications channel 64. After being delayed in the delay circuit 66, the voltage signal is fed to the evaluation circuit 68. The receiver 72 receives a signal from the remote protective relay 34; the signal represents the sum of the three phase currents at the local terminal 14 and the remote terminal 16. The evaluation circuit 68 compares the voltage signal produced locally with the signal from the receiver 72 to determine whether the fault is on the transmission line section 12. The evaluation process performed in the evaluation circuit 68 is identical to that performed in the evaluation circuit 58. If the fault is on the transmission line section 12, the evaluation circuit produces a signal for opening the contacts of the circuit breaker 44.

Turning now to the remote protective relay 34, note that it contains several components identical in structure and function to those of the local protective relay 20 and the remote protective relay 26. Therefore, these components will be discussed only generally. The sequence filter 42 produces a voltage signal representative of the three phase currents at the remote terminal 16. The voltage signal is input to a delay circuits 74, 89 and 91. The delay circuits 89 and 91 provide a signal to the vector summers 78 and 80, respectively. The delay circuit 74 delays the voltage signal so that it is time-coincident with the signals from the local terminal 14 and the remote terminal 18. The delayed voltage signal from the delay circuit 74 is fed to a first input terminal of an evaluation circuit 76. An output terminal of the evaluation circuit 76 is connected to a control input terminal of the circuit breaker 32. A receiver 82 receivers the modulated signal from the transmitter 70 (at the remote terminal 18) via the communications channel 64. Receiver 82 demodulates the received signal and produces a demodulated signal representative of the three phase currents at the remote terminal 18. The demodulated signal is input to a second input terminal of the evaluation circuit 76. A receiver 84 receives and demodulates a signal from the transmitter 62 (at the local terminal 14) to produce a demodulated signal representative of the three phase currents at the local terminal 14. The demodulated signal from the receiver 84 is input to a third input terminal of the evaluation circuit 76. The evaluation circuit 76 compares the three signals input thereto determine if the fault is on the transmission line section 12. If the fault is located on the transmission line section 12, a signal from the evaluation circuit 76 opens the circuit breaker 32.

One important feature of the remote protective relay 34 is the inclusion of the vector summers 78 and 80. Inclusion of the vector summers 78 and 80 reduces the number of receivers and transmitters necessary for the protective relay system 10 because the signals are summed before transmission. Recall that the voltage signal from the sequence filter 42 is fed through the delay circuits 89 and 91 to a first input terminal of each of the vector summers 78 and 80. A second input terminal of the vector summer 78 receives the demodulated signal from the receiver 82. A second input terminal of the vector summer 80 receives the demodulated signal from the receiver 84.

The signals input to the vector summer 78 represent the three phase currents at the remote terminal 18 and the three phase currents at the remote terminal 16. The delay circuit 89 ensures proper phase coincidence between the signals from the remote terminal 18 and the remote terminal 16. The vector summer 78 sums the two signals input thereto and inputs the resultant sum to the transmitter 86. Therefore, the signal modulated and transmitted by the transmitter 86 represents the sum of the three phase currents at two terminals of the transmission line section 12. This technique reduces the number of transmitter receiver pairs in the protective relay system 10.

Likewise, the vector summer 80 sums the signals input thereto, which represent the three phase currents at the remote terminal 16 and at the local terminal 14, with the former delayed by the delay circuit 91 to ensure proper phase coincidence. The resultant sum is fed to the transmitter 88 for transmission to the protective relay 46 at the remote terminal 18.

To summarize the operation of the remote protective relay 34 at the remote terminal 16, note that signals representing the currents at the local terminal 14 and the remote terminal 18 are received by the remote protective relay 34. In the evaluation circuit 76, the received signals are compared with the signal representing the three phase currents at the remote terminal 16 to determine if the fault is on the transmission line section 12. Additionally, in the remote protective relay 34 the locally generated voltage signal is summed with each of the received signals to produce a sum signal. The sum signals are then transmitted to the local terminal 14 and the remote terminal 18 such that signals representing the three phase currents at each terminal of the transmission line section 12 are available at each terminal.

Figure 2:
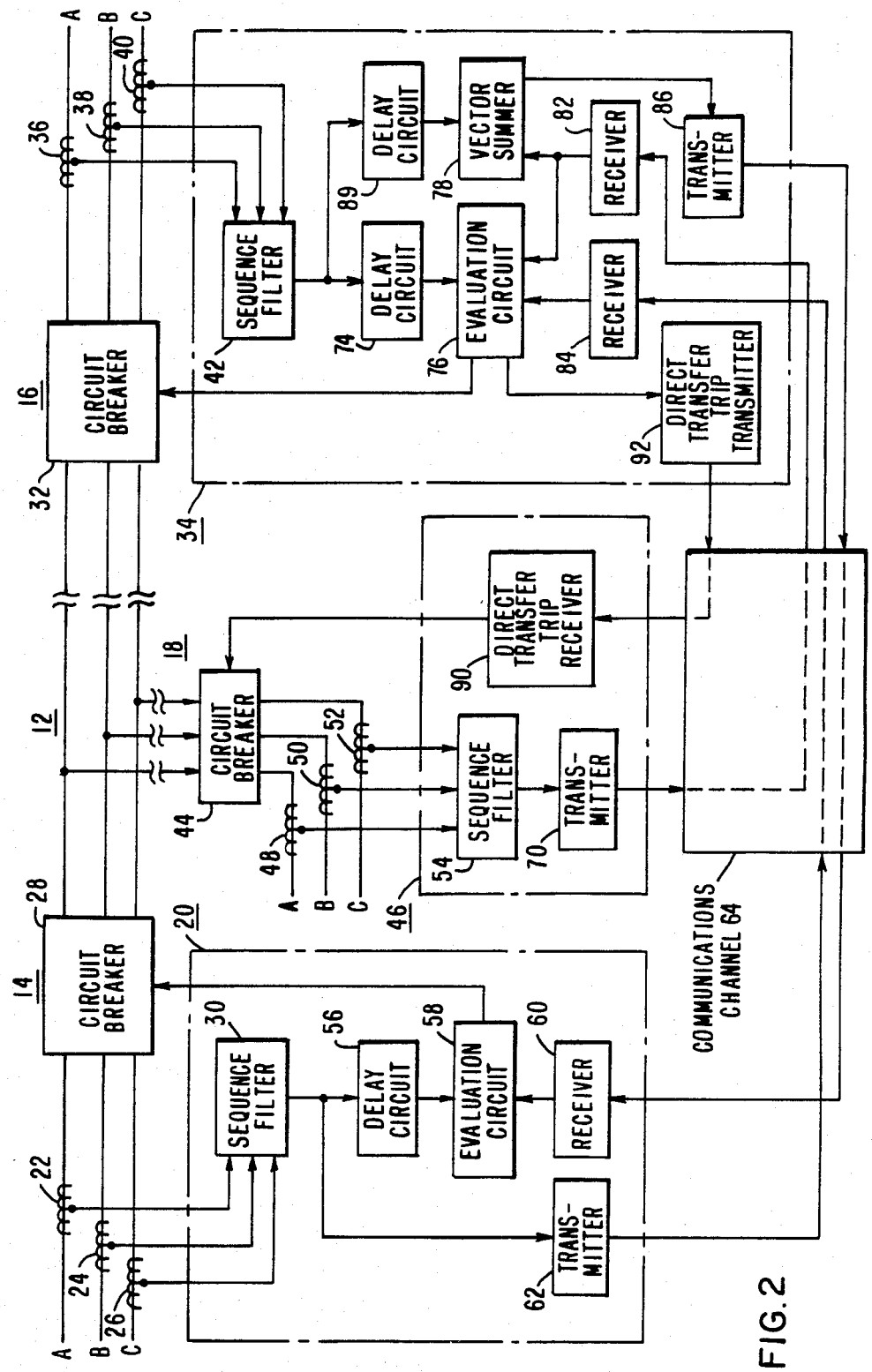

FIG. 2 depicts a second embodiment of the present invention. The components of FIG. 2 are identical in structure and function to the components bearing identical reference characters in FIG. 1. The embodiment of FIG. 2 is somewhat simplified from the embodiment illustrated in FIG. 1.

In the remote protective relay 46, the delay circuit 66 and the evaluation circuit 68, which are shown in FIG. 1, are eliminated in FIG. 2. There is no evaluation of the three phase currents performed in the remote protective relay 46. Instead, the remote protective relay 46 includes a direct transfer trip receiver 90, see FIG. 2, that is responsive to a direct transfer trip signal from a direct transfer trip transmitter 92 of the remote protective relay 34. That is, when the direct transfer trip receiver 90 receives a transfer trip signal from the direct transfer trip transmitter 92 (in a manner to be discussed hereinbelow) the direct transfer trip receiver 90 opens the contacts of the circuit breaker 44. Although it is unnecessary to evaluate the three phase currents in the protective relay 46 of the FIG. 2 embodiment, it is necessary, to ensure blocking for external faults, to transmit the voltage signal representing the three phase currents at the remote terminal 18 to the protective relay at the remote terminal 60. Thus, the transmitter 70 is included in the embodiment of FIG. 2.

The remote protective relay 34 does not include the vector summer 80 and the transmitter 88 in the FIG. 2 embodiment. Instead, the evaluation circuit 76, using the signals representing the three phase currents of the three terminals of the transmission line section 12, determines whether the fault is on the transmission line section 12. If the fault is located thereon, the evaluation circuit 76 produces the signal for opening the circuit breaker 32 and produces a transfer trip signal that is fed to the direct transfer trip transmitter 92. From the direct transfer trip transmitter 92, the signal is propagated to the direct transfer trip receiver 90 via the communications channel 64. Note that this FIG. 2 embodiment simplifies the protective relay 34 at the remote terminal 16 and the remote protective relay 46 at the remote terminal 18. Tripping at the remote terminal 18 is delayed only by the transmission time of the direct transfer trip signal from the direct transfer trip transmitter 92 to the direct transfer trip receiver 90. More details of a direct transfer trip scheme can be found in U.S. Pat. No. 397,758 (filed July 13, 1982), which is assigned to the assignee of the present invention.

Having now discussed the present invention in detail, the advantages and benefits thereof are easily observable. The three-terminal current differential protective relay system of the prior art requires six transmitter/receiver combinations, but the present invention reduces this number to four, thereby simplifying system hardware and reducing cost. Despite this hardware reduction, high-speed tripping at all terminals of the transmission line, for all internal phase and ground faults is still accomplished. The system can be further simplified by utilizing a direct transfer trip scheme. Lastly, it is possible to use any of the various available communications medium for the communications channel.

What is claimed is:

1. A current differential protective relay system for detecting a fault on an ac electric power network having first, second, and third terminals, and for opening a circuit interrupter at each terminal thereof, said current differential protective relay system comprising:

means responsive to the current at each of the first, second, and third terminals of the electrical power network for producing a first current signal at the first terminal, a second current signal at the second terminal, and a third current signal at the third terminal;

first communications means for communicating said first current signal to the second terminal;

second communication means for communicating said third current signal to the second terminal;

first summing means at the second terminal for producing a first sum signal representative of the vector sum of said first and second current signals;

second summing means at the second terminal for producing a second sum signal representative of the vector sum of said second and third current signals;

third communications means for communicating said first sum signal to the third terminal;

fourth communications means for communicating said second sum signal to the first terminal; and comparator means at each of the first, second, and third terminals for logically relating said first current signal and said second sum signal at the first terminal, for logically relating said first, second, and third current signals at the second terminal, and for logically relating said third current signal and said first sum signal at the third terminal, to detect a fault on the electrical power network and for tripping the circuit interrupter at the first, second, and third terminals.

2. The current differential protective relay of claim 1 wherein the means responsive to the current includes a current transformer at each of the first, second, and third terminals of the electrical power network.

3. The current differential protective relay of claim 1 wherein the first communications means includes a transmitter at the first terminal for producing a transmitted signal representative of the first current signal, a communications medium for propagating said transmitted signal, and a receiver at the second terminal for receiving said transmitted signal and for regenerating the first current signal.

4. The current differential protective relay of claim 1 wherein the second communications means includes a transmitter at the third terminal for producing a transmitted signal representative of the third current signal, a communications medium for propagating said transmitted signal, and a receiver at the second terminal for receiving said transmitted signal and for regenerating the third current signal.

5. The current differential protective relay of claim 1 wherein the third communications means includes a transmitter at the second terminal for producing a transmitted signal representative of the first sum signal, a communications medium for propagating said transmitted signal, and a receiver at the third terminal for receiving said transmitted signal and for regenerating the first sum signal.

6. The current differential protective relay of claim 1 wherein the fourth communications means includes a transmitter at the second terminal for producing a transmitted signal representative of the second sum signal, a communications medium for propagating said transmitted signal, and a receiver at the first terminal for receiving said transmitted signal and for regenerating the second sum signal.

7. A current differential protective relay system for detecting a fault on an ac electrical power network having first, second and third terminals, and for opening a circuit interrupter at each terminal thereof, said current differential protective relay system comprising:

means responsive to the current at each of the first, second, and third terminals of the electrical power network for producing a first current signal at the first terminal, a second current signal at the second terminal, and a third current signal at the third terminal;

first communications means for communicating said first current signal to the second terminal;

second communications means for communicating said third current signal to the second terminal;

summing means at the second terminal for producing a sum signal representative of the vector sum of said first and third current signals;

communications means for communicating said sum signal to the first terminal;

comparator means at each of the first and second terminals for logically relating said first current signal and said sum signal at the first terminal, and for logically relating said first, second, and third current signals at the second terminal, for tripping the circuit interrupter at the first and second terminals if a fault on the electrical power network is detected;

transfer trip transmitter means at the second terminal for producing a transfer trip signal when the fault is on the electrical power network;

transfer trip receiver means at the third terminal, responsive to said transfer trip signal, at the third terminal, for tripping the circuit interrupter at the third terminal when a fault has occurred on the electrical power network.

* * * * *